(12) United States Patent
Kalmes et al.

(10) Patent No.: US 6,934,715 B2
(45) Date of Patent: Aug. 23, 2005

(54) METHOD FOR COLLECTING AND STORING DATA REGARDING TERMS AND CONDITIONS OF CONTRACTUAL AGREEMENTS

(75) Inventors: Michael Kalmes, Atlanta, GA (US); Jeffrey Whittingham, Kennesaw, GA (US); Douglas Carl Bacon, Marietta, GA (US); Robert Michael VanBrackle, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 10/200,596

(22) Filed: Jul. 23, 2002

(65) Prior Publication Data

US 2004/0019578 A1 Jan. 29, 2004

(51) Int. Cl.[7] .............................................. G06F 17/30
(52) U.S. Cl. ............................ 707/102; 707/2; 707/5; 707/100
(58) Field of Search .......................... 707/1, 2, 5, 100, 707/102, 3, 4, 103 R, 200, 201; 235/384; 705/1, 38, 2, 3, 8, 26, 37; 715/511, 531, 508, 530; 709/205, 235

(56) References Cited

U.S. PATENT DOCUMENTS

| | | | | |
|---|---|---|---|---|
| 5,446,653 A | * | 8/1995 | Miller et al. ................... | 705/4 |
| 5,692,206 A | * | 11/1997 | Shirley et al. ............... | 715/531 |
| 5,799,282 A | * | 8/1998 | Rakshit et al. ................ | 705/2 |
| 6,067,531 A | * | 5/2000 | Hoyt et al. ................... | 705/35 |
| 6,366,892 B1 | * | 4/2002 | Altman et al. ................ | 705/38 |
| 6,502,113 B1 | * | 12/2002 | Crawford et al. ........... | 715/530 |
| 2002/0129056 A1 | * | 9/2002 | Conant et al. .............. | 707/511 |
| 2002/0178120 A1 | * | 11/2002 | Reid et al. .................... | 705/59 |

OTHER PUBLICATIONS

CFO.com, "Contract Automation: Digitizing the Party of the First Part", Oct. 17, 2001, pp. 1–3.
diCarta, Inc.—Enterprise Contract Management, "diCarta Announces Next Generation Enterprise Contract Management—diCarta contracts 2.0", Oct. 30th, 2001, pp. 1–3.
Accenture, "Managing Contracts To Increase Revenue and Profits", pp. 1–24.

* cited by examiner

Primary Examiner—Shahid Alam
Assistant Examiner—Fred I. Ehichioya
(74) Attorney, Agent, or Firm—Nixon & Vanderhye, P.C.

(57) ABSTRACT

A method is disclosed for collecting and storing data in a database of a computer system regarding a contractual agreement comprising: establishing a plurality of data fields in said database corresponding to a selected contract term or contract condition; identifying a clause in the contractual agreement corresponding to the selected contract term or contract condition; comparing the identified clause to a standard contract clause corresponding to the selected contract term or contract condition; if the identified clause is substantively the same as the standard contract clause, then storing in one of said data fields data indicating that the contractual agreement includes the standard contract clause for the selected contract term or contract condition, and if the identified clause differs substantively from the standard contract clause, collecting additional data regarding the identified non-standard clause and storing the additional data in appropriate fields of said plurality of data fields.

10 Claims, 5 Drawing Sheets

Risk Factors

| Complete | Risk Factor | Complete | Risk Factor |
|---|---|---|---|
| ☐ | Application of New Technology | ☐ | Assignment |
| ☐ | Limit of Liability | ☐ | Termination |
| ☐ | Title Transfer | ☐ | Spare Parts Delivery |
| ☐ | End of Term Obligation | ☐ | Governing Law |
| ☐ | Dispute Resolution | ☐ | Payment |
| ☐ | Contracted Performance | ☐ | Inventory Utilization |
| ☐ | Insurance | ☐ | Contracting Party/Payment Security |
| ☐ | Taxes | ☐ | Warranty |
| ☐ | Work Scope | ☐ | Tire Warranty |
| ☐ | Contract Basics | ☐ | Fee Structure |
| ☐ | Escalation | ☐ | Notification |

Fig.2

DEFAULT CONTRACT Contracted Performance

| | |
|---|---|
| Availability Guarantee | Yes |
| Start Date: COD plus # Months | 0 |

Guarantee Levels

| | |
|---|---|
| Are Guarantee Levels linked to a maintenance event? | No |

| | | |
|---|---|---|
| Avg Availability % | 96 | |
| Bonus | Yes | |
| Bonus Basis | $ Per %/Bonus Per Covered Unit | $ Per Year Cap Bonus Per Covered Unit |
| ☑ $ Per %/Bonus Per Covered Unit | 35000 | 140000 |
| ☐ Sparks Spread | Please select one | 0 |
| 100% US Currency | Yes | |
| Currency Type | Please select one | |
| Exchange Rate Used | 0 | |
| LDs | Yes | |
| LD Basis | $ Per %/LD Per Covered Unit | $ Per Year Cap LD Per Covered Unit |
| ☑ $ Per %/LD Per Covered Unit | 35000 | 175000 |
| ☐ Sparks Spread | Please select one | 0 |
| 100% US Currency | Yes | |
| Currency Type | Please select one | |
| Exchange Rate Used | 0 | |

Fig. 3

DEFAULT CONTRACT Limit of Liability

160

| Limit Of Liability | Yes |
|---|---|

Dollar Amount of Basic LOL

| Aggregate | Yes | % of Contract Value | 100 | must be numeric |
|---|---|---|---|---|
| Yearly | Yes | | | |
| Yearly Cap Basis | Based on Contract Price | Other Basis | | |
| | Y0 100 | Y3 100 | Y6 100 | Y9 100 |
| Per Event | No | | | |
| Per Event Cap Basis | Please select one | Other Basis | | |
| | Y0 0 | Y3 0 | Y6 0 | Y9 0 |

162

| Are Dollar Amounts of Basic LOL 100 % US currency | Yes |
|---|---|
| Currency Type | Please Select One    Exchange rate 0 |
| Does this contract have Exceptions to Basic LOL | Yes |

Check All that Apply to this Contract

| ⦿ Yes ○ No | personal Injury | Edit | ○ Yes ⦿ No | LD's | |
| ⦿ Yes ○ No | Patent Indemnification | Edit | ⦿ Yes ○ No | Gross Negligence | Edit |
| ⦿ Yes ○ No | Willful Misconduct | Edit | ⦿ Yes ○ No | Environmental Indemnification | Edit |
| ○ Yes ⦿ No | Uplanned Maintenance | | ○ Yes ⦿ No | Warranty | |
| ○ Yes ⦿ No | Fraud | | ⦿ Yes ○ No | Property Damage | Edit |

METHOD FOR COLLECTING AND STORING DATA REGARDING TERMS AND CONDITIONS OF CONTRACTUAL AGREEMENTS

BACKGROUND OF THE INVENTION

The present invention relates generally contract management systems that organize and analyze the terms and conditions of contractual agreements.

Written contracts are commonly used to document agreements that have been negotiated between two or more business or other persons or entities. These contracts are critical as they define the obligations between the parties to the contract, such as the terms of payment, warranties and indemnities, product or service to be delivered, and many other conditions relevant to the parties to the contract. Contracts tend to be prepared individually for each agreement, but often have similar terms and conditions. Large corporations and governments have standard clauses for certain terms and conditions that are to be included in the contracts they execute. See e.g., U.S. Government Federal Acquisition Rules (FAR).

Large corporations and governments may have dedicated staff for preparing and reviewing contracts. The staff may collect information from persons in the corporation and government negotiating the contract, and from persons who will be responsible for the performance of the contract. The amount of information needed by the staff for each contract may depend on the risk, e.g., dollar value, that the proposed contract presents to the corporation. The amount of information needed from a contract depends, at least in part, on the extent the terms and conditions of the contract vary from standard terms and conditions. For contracts having standard terms and conditions, the company may already have much of the information needed to determine the risk of the contract. Standard terms and conditions have been previously analyzed for potential risks. Those known risks are assigned to contracts having a standard term and condition.

However, contracts having terms and conditions that deviate from standards require a reassessment of the associated risk. To reassess the risk, addition information may need to be collected regarding the non-standard term or condition of the contract. There is a long-felt need for an organized and reliable contracting tool to collect information about contract, for purposes such as risk analysis. This need is especially strong with respect to collecting information regarding non-standard contract clauses.

There is a tendency for contracting staff to collect a great amount of information for each and every contract, including from those smaller contract where only standard contract terms are most often used, and only a minimal amount of information is needed and the risk posed to the company by the contract is small. This over-collection of information is wasteful and delays contract completion. However, there is a danger of not collecting sufficient information because the staff may underestimate the risk of a potential contract if it fails to have information regarding non-standard contract clauses. If insufficient information is collected, the persons reviewing and approving the contract may be doing so without all of the information needed to properly consider the proposed contract.

Once a contract has been prepared by a corporation or other organization, the contract may need to be reviewed by various persons who are to approve the contract or, after the contract is executed, who need to know the obligations and performance requirements stated in the contract. In the past, contracts may have been stored in a file cabinet or in an electronic storage location. However, the contract may not have been stored in a readily accessible file cabinet or electronic file such that all persons having a need to review the contract could quickly obtain the contract for review. Further, the terms and conditions of the contract may not have been stored such that they can be readily obtained and compared to familiar terms and conditions of the other contracts. Accordingly, there is a long felt need for computerized contract automation systems that assist in the preparation, review and storage of contracts, especially with respect to selected terms and conditions of contracts.

BRIEF SUMMARY OF THE INVENTION

In one embodiment, the invention is a method for collecting and storing data in a database of a computer system regarding a contractual agreement comprising: establishing a plurality of data fields in said database corresponding to a selected contract term or contract condition; identifying a clause in the contractual agreement corresponding to the selected contract term or contract condition; comparing the identified clause to a standard contract clause corresponding to the selected contract term or contract condition; if the identified clause is substantively the same as the standard contract clause, then storing in one of said data fields an indication that the contractual agreement includes the standard contract clause for the selected contract term or contract condition, and if the identified clause differs substantively from the standard contract clause, collecting additional data regarding the identified non-standard clause and storing the additional data in appropriate fields of said plurality of data fields.

In another embodiment, the invention is a method for collecting data in a database of a computer system regarding contractual agreements comprising: establishing standard contract clauses for selected contractual terms and conditions; comparing clauses in a contractual agreement to the standard contract clauses; identifying the clauses in the contractual agreement that are substantively the same as at least one of the standard contract clauses, and entering data in the database identifying those clauses of a contract that are substantively the same as the at least one of the standard contract clauses; for those clauses in the contractual agreement that are not substantively the same as at least one of the standard contract clauses, issuing a prompt from the computer system to collect information regarding the non-standard clauses which is not requested for corresponding standard clauses.

In a further embodiment, the invention is a method for collecting data in a database of a computer system regarding contractual agreements comprising: identifying a clause in a contractual agreement corresponding to a selected contract term or contract condition; comparing the identified clause to a standard contract clause corresponding to the selected contract term or contract condition; if the identified clause is substantively the same as the standard contract clause, then storing in one of said data fields data indicating that the contractual agreement includes the standard contract clause for the selected contract term or contract condition and assigning a standard risk factor to the identified clause, and if the identified clause differs substantively from the standard contract clause, collecting additional data regarding the identified contract clause, storing the additional data in appropriate fields of said plurality of data fields, and assessing a risk associated with the identified clause based on the additional data collected.

BRIEF DESCRIPTION OF THE DRAWINGS

The accompanying drawings in conjunction with the text of this specification describe an embodiment of the invention.

FIGS. 2 to 4 are an exemplary series of data collection display screens for collecting the terms and conditions of a contract to be entered into a database.

DETAILED DESCRIPTION OF THE INVENTION

A user-friendly, multi-purpose web-based computer software application and database has been developed that captures and electronically stores data regarding certain terms and conditions, e.g., clauses, of contracts, such that these terms can be reviewed and analyzed. The software application may be electronically accessed using a common browser program, e.g., Netscape (tm) or Microsoft (tm) Explorer, via an intranet or the Internet. Further, remote access to the computer software application may be had via a extranet or Internet computer network.

The terms and conditions software application 126 and database 104 provides a centralized collection of contracts executed by a company, and data related to contract terms and conditions that are standard for the company and have been included in executed contracts. The database 104 also captures and identifies for subsequent searches certain key terms and conditions of executed contracts, such as those that relate to the financial and business risk posed by a contract to a company. The software application includes reporting functions that allow inquiries to be made of the database to gather information regarding the contracts. For example, reports may be generated regarding the business risks facing a company based on an analysis of one or more executed contracts.

Figure 1:
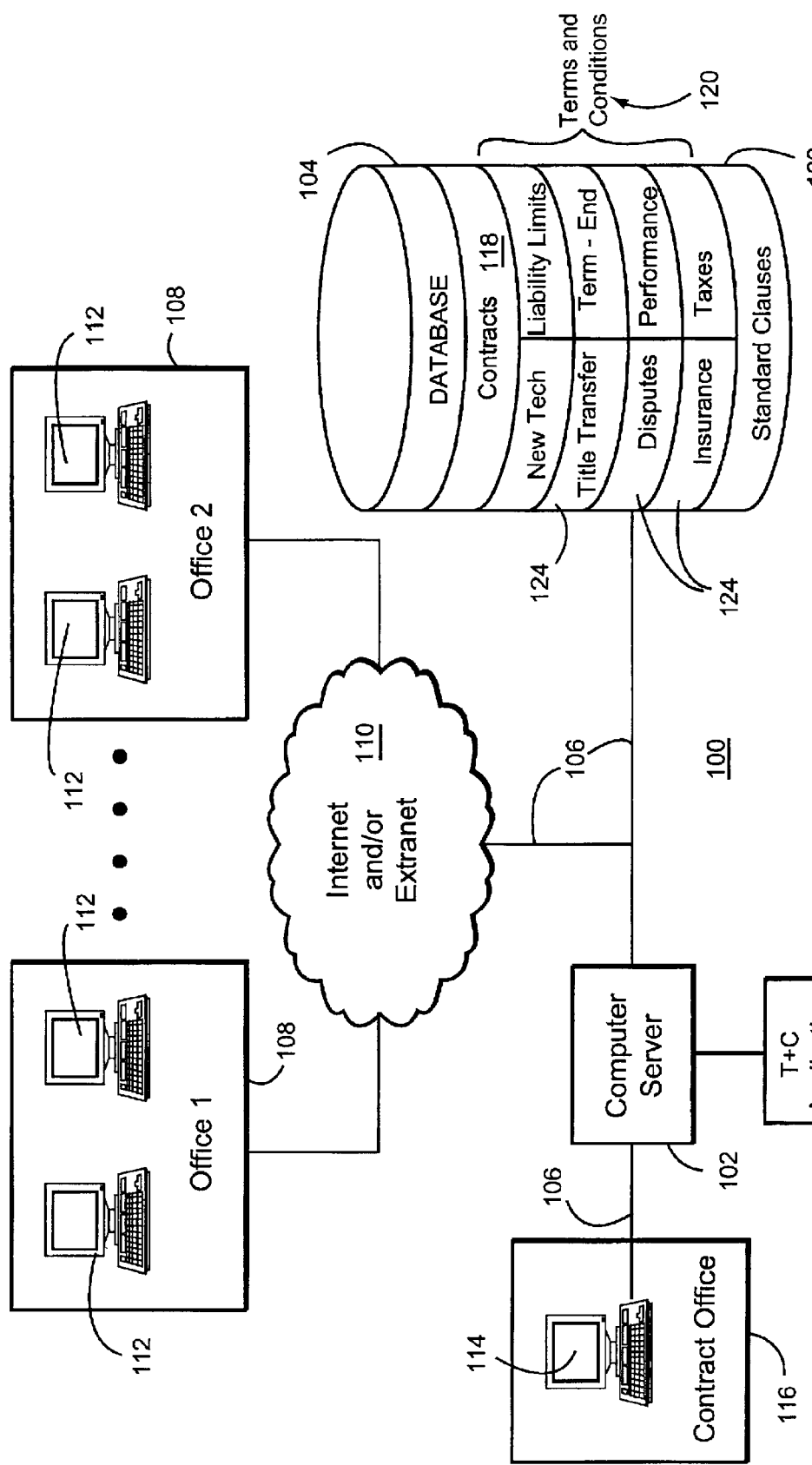
FIG. 1 is a schematic illustration of a computer and database system embodying the current invention.

FIG. 1 shows a schematic illustration of a computer and database system 100 comprising a central computer server 102 and a central database 104 stored in memory accessible by the server. The computer server and database may be arranged on a computer network 106 that is in communication with other computer systems 108 such as via an internet or the Internet 110. The other computer systems may have computer terminals 112 through which persons associated with a company may access the contract information available on the computer server 102 and database 104. In addition, a computer system 114 for a contracting staff office 116 may be on the same computer network 106 as are the computer server 102 and database 104. The contract staff may enter through their computers 114 much of the data regarding certain terms and conditions of the contracts that are executed or are being considered by their company. This data is stored on the database 104 by the computer server 102.

The database 104 may include several searchable data groups regarding contracts executed and under consideration by the company. Each data group will have one or more associated data fields to collect specific information related to the group. For example, each group may have a field to indicate whether a subject contract has a standard contract clause (or clauses) for the term or condition corresponding to the group. If a standard clause is used in the group, then other data fields in the group may be left unfilled or filled with standard data corresponding to the standard contract clause. Such standard data may be automatically populated into the database fields, by the T&C application from stored data related to the standard contract. If a non-standard contract clause is in the contract, then the data fields for the corresponding data group may be populated with data specific to the non-standard clause. This data is entered by a contracting staffer who is reviewing the contract. For example, the data fields may store information regarding time periods, liability limits, performance obligations and monetary amounts that are unique to the non-standard clause. If a standard contract clause issued, then much of the data in the fields is common to all contracts with the standard clause, and the data need not be re-entered for a new contract. To collect the data regarding the non-standard clause, the T&C application prompts a user to enter detailed and specific information needed to populate the data fields.

The database may also include fields for storing actual copies of the contract 118 (text searchable or an image of the signed contract), selected terms and conditions 120 in each contract, standard contract clauses 122 to be used in future contracts, and financial reports and predictions 142 regarding contract performance.

The data groups 124 of the terms and conditions can be determined and defined by a company or other organization to collect and organize the information from contracts that the company or organization desires to track and analyze. Some of the data groups and their associated data fields for the terms and conditions may be applicable to all contracts executed by a company, e.g., limit of liability, governing law, assignment, and dispute resolution. Other data groups of terms and conditions may be specific to certain products or services sold or procured by the company, such as, spare parts delivery and tire warranty. The selection of terms and conditions data fields may be made by the contracting staff, working in cooperation with management of the company, and may be the type of reports, e.g., risk and reward studies, to be generated by a company regarding its contracts.

The data groups 124 of the terms and conditions shown disclosed in Table I here are exemplary. Terms and conditions, other than those listed in Table I, may be selected as data fields and defined in implementing the present invention.

TABLE I

| DATABASE FIELDS FOR TERMS AND CONDITIONS | |
|---|---|
| Application of New Technology | Assignment |
| Limit of Liability | Termination |
| Title Transfer | Spare Parts Delivery |
| End of Term Obligation | Governing Law |
| Dispute Resolution | Payment |
| Contracted Performance | Inventory Utilization |
| Insurance | Contracting Party/Payment Security |
| Taxes | Warranty |
| Work Scope | Tire Warranty |
| Contract Basics | Fee Structure |
| Escalation | Notification |

Each of the terms and condition data groups has an associated definition. The definition of each term and condition should be sufficient to enable persons in of the contracting staff to enter the appropriate data, e.g., text, alphanumerical data, monetary sums, rating values and other information, in the associated data group corresponding to the data group and its term or condition.

Some exemplary definitions for data groups are as follows and are intended to provide an exemplary context for the description of the T&C application. These definitions are not comprehensive and are not intended to provide a complete description of standard contracting terms and conditions. The selection and definition of standard contracting terms and conditions will depend on and likely be prepared by each company.

Limit of Liability (LOL): The LOL is ensures that the level risk a company accepts with the obligations imposed by a contract has limitations to ensure that the liability has a rational relationship to the level of reward the company will receive from the contract. The LOL may be a standard contract term and condition for a company that each contract to be signed by the company have an effective limitation of the company's exposure to liability for direct damages to customer with respect to money exposure and time obligations on the company, and an absolute exclusion of consequential damages. Standard data may be automatically filled into data fields of the LOL data group when a standard LOL clauses(s) is in the contract. If a non-standard LOL clause is in the contract, the data specific to that clause, e.g., liability dollar limits and liability time periods, are to be collected from the contract and entered into appropriate data fields of the LOL data group.

The risk associated with a contract with depend, at lest in part, on the differences between standard contract terms and conditions and the actual terms and conditions in a contract. These differences represent deviations from normal company contracting practices, and may represent higher or lower risk associated with the contract over and above the level of risk normally associated with similar contracts. Because these deviations from standard terms and conditions affect the risk of a contract, the T&C application 126 collects additional data regarding deviations in the terms and conditions of a contract. The data regarding these deviations is used to determine the risk to the company associated with the contract. Acceptance of deviations by the management of a company will depend on an evaluation of risk and reward analysis, which is facilitated by the additional information collected on those terms and conditions of a contract that differ from the company's standard terms and conditions.

Title Transfer: The title transfer risk inquiry in the T&C application monitors the flow of the ownership title of the delivered products, e.g., component parts, as the product passes from the supplier company to the customer. For a standard title transfer contract clause, the associated data and risk may be well defined, known and automatically added to the data group of title transfer for the contract. There may be little or no additional information that needs to be collected form a contract about title transfer is a standard clause is in the contract. Accordingly, the T&C application may not prompt a user to enter additional data about a title transfer clause, if the user identifies the contract as having a standard title transfer clause. Additional information will be requested from the user, if the contract is indicated as having a non-standard title transfer clause.

For example, it may be preferable that the title to product to be shipped from within the United States shall pass to the customer when the product is made available for shipment from the manufacturer's factory or other point of shipment by the supplier company to the customer. But, the title to products to be shipped from a country other than the United States shall pass to the customer at the port of export from the U.S. immediately after the product has been cleared for export. While these title transfer terms may be preferred, an actual contract may specify different transfer terms. Such differences form the preferred contracting terms are treated as deviations by the T&C application and may increase the risk factor assigned to the contract. The T&C application collects detailed information about the shipment and title transfer terms of a contract having a non-standard clause for title transfer.

The T&C application allows a company to established desired (also referred to as standard) terms and conditions for its contracts, and to track the actual terms and conditions for proposed and executed contracts. Moreover, to the extent that the term and conditions in an actual contract (proposed or executed) differs from the company's standard terms and conditions, then the T&C application collects data regarding the deviation.

Contracted Performance: A company may specify standard terms and conditions for determining the timing and criteria of deliverable products or services under a contract. The T&C application collects additional data regarding the terms and conditions of contract performance guarantees or the lack thereof that deviate from the standard performance terms and conditions.

Escalation: The T&C application gathers exposure data regarding non-standard escalation terms and conditions to determine the increase in payments from the customer adjusted for inflation indexes. The indexes may be tied to payment type and currency type. The risk of a contract may be influenced by the escalation terms of a contract. There may be a standard risk assigned to contracts have a standard escalation clause. The risk associated with contractual escalation clauses that deviate from the standard escalation clause may need to be determined specifically for that contract. To evaluate the risk associated with a deviate escalation clause, the T&C application may prompt the user to enter additional information regarding the non-standard escalation clause in a contract.

Each of the identified terms and conditions shown in Table 1 have an associated data group and data fields to collect data material to that term or condition. If a contract has a non-standard clause for an identified term or condition, the T&C application will collect the additional information needed to fill in the associated data fields. With the collected information and the organization of that information provided by the data fields, the unique risk presented by the non-standard clause may be better determined.

The T&C application 126 is executed on the computer server 102 and accesses the database 104 to prompt a user, e.g., a contracting officer, to enter information into the database regarding a contract 128. The amount and type of information about a contract that is requested by the T&C application dynamically varies the amount of information gathered during the contract deal process based on the risks added or deleted to or from a contract.

Data from the contract, i.e. T&C data 130, is entered into the T&C application 126. The T&C application prompts a user to enter information about the various terms and conditions of the contract so that information about each term and condition of the contract can be entered into its corresponding database field. As information is being entered and depending on the term and condition for which the information is being entered, the T&C application will prompt the user for more detailed information about the risk posed to a company by a contract. The T&C application prompts a user to enter extensive information primarily with respect to non-standard contract clauses.

The terms and conditions data 120 from the T&C database is available for use by the company during the evaluation and performance of the contract. If the risk posed by the contract is not acceptable, then the terms and conditions of the proposed contract are modified 142, and the modified contract is modeled to determine its risks and rewards. The T&C application allows contracts to be readily analyzed to determine the performance obligations of a company, and to facilitate a risk and reward analysis of the contract. For example, using the T&C application in a supply-chain management process, the persons in a company responsible for the supply-chain elements, opportunity management, project parts service and repairs (PS&R), recast portfolio, logistics management, inventory optimization, may better prepared and organized to perform the contract. Having the persons responsible for the elements of the supply-chain aware of the contractual obligations undertaken by their company further lowers the risk that the company will not be able to meet a contractual obligation.

The T&C application 126 also allows the entire supply-chain operation of a company to access the database and obtain information on important terms and conditions of contracts that affect the different elements of the chain. Giving ready access to an entire supply-chain operation of critical terms and conditions of contracts in a database format enables the persons responsible for various elements of the supply chain to order raw materials, services, and schedule personnel and manufacturing processes more efficiently to satisfy the demand for products that have been ordered by contract. With a more efficient supply-chain, the cost to the company of providing a product or service can be lowered and the capacity of the supply-chain to provide products or services may be increased. Using the T&C application, persons responsible for various supply-chain tasks will be able to determine the supply obligations imposed by contracts, and therefore be able to efficiently, without excessive costs, execute the supply tasks.

FIGS. 2 to 4 are exemplary data collection screen images used to collect data regarding the terms and conditions of a contract. These screen images are generated by the T&C application to prompt a user to enter data regarding the terms and conditions of a contract. The sequence of data collection images may appear on the display screen of a computer 114 of a contract official in the contracting office 116, and used by that official to enter information into the database regarding a new contract. Specifically, the screens prompt the contracting official to identify certain data in a contract for the various data groups and fields for the terms and conditions 120 of the contract. These screens may also used by others in a company working at remote computers 112 to also enter information into the database regarding the terms and conditions of a new contract.

The screens prompt the user to enter information about a contract into the database, showing the sequence of data collection for terms and condition of a contract. FIG. 2 shows an exemplary initial screen 144 identifying each of the terms and conditions tracked by the T&C application. The listing of terms and conditions prompts a user to review a contract to determine whether the terms and conditions in the contract deviate from the standard terms and conditions. The initial screen prompts the user with check boxes 146 to confirm that all the needed data for each identified terms and conditions 120 of a contract has been collected and entered into the database.

The T&C application 126 displays subsequent screens corresponding to each identified term and condition 120 listed in the initial screen 144. The sequence of subsequent screen images changes dynamically depending on the type and amount of data collected regarding the terms and conditions of a contract, and on whether contract clauses deviate from standard contract clauses. The screen images and sequence of screen images used by the T&C application to collect contract data will vary from company to company, and may vary depending of the precedence of non-standard clauses in a contract.

FIGS. 3 and 4 are two exemplary screen displays showing the prompts and types of data collected for a default condition of a contract. The default condition may be a screen image associated with the "Contracted Performance" term and condition 120 shown in FIG. 4. The default screen image 148 is an example of the manner in which data is obtained regarding a contract from a user. For example, the default screen image 148 includes selectable data boxes 152, many of which have associated pull-down lists of data entry selections, for collecting data from the contract. The screen image 148 includes a prompt to indicate whether the contract includes an availability guarantee prompt 150, which may obligate the company to maintain an inventory of the products that are the subject of the contract. As inventory costs affect the cost associated with a contract, the presence of an availability guarantee may need to be considered in modeling the contract. The information collected regarding the availability guarantee is requested regardless if the corresponding contract clause is standard or non-standard. Even with standard clauses, the T&C application collects certain data, e.g., number of months allowed for delivery of a product and whether a guarantee level is linked to a maintenance event, that may be specific to contracts.

If there is no availability guarantee, then the screen image does not request additional information regarding such guarantees. To avoid collecting additional information, the display screen may not show additional data fields 152 related to the availability guarantees when the box 150 is set to a NO. But, if there is an availability guarantee, then the screen prompts a user to enter data, such as by enabling and highlighting, into additional data fields 152 for collecting information on the period stated in the contract for delivering a product and the levels, e.g., quantity of products, that are guaranteed to be available. For many of the data fields, when certain conditions or data is entered, such as the enter of a YES, then the T&C application automatically presents further data collect fields that request additional information related to the earlier data field.

The screen 148 also prompts the user to enter data 154 regarding the average availability of the product that is the subject the contract. Data regarding average availability of a product is used by the financial modeling program to determine the risk associated with guaranteeing that a product will be available. The data field 154 for the average availability may be automatically filled in if that information is already available on the T&C data base. This example shows how the T&C application dynamically varies the amount of information collected regarding a contract and based on data entries made regarding the contract.

Another example of the collection of T&C Contracted Performance data, is whether a bonus 156 for early delivery is included in the contract and whether the contract includes a liquidated damages (LD) clause 158 in the contract. If the data fields for bonus 156 and LD 158 are selected to be YES, then the screen displays additional data fields to collect data regarding those clauses. The additional data may include the monetary amount of the bonus or liquidated damages. The data collected on a monetary bonus or damages may include the currency type, e.g., U.S. dollars, to be used in paying the contract. The bonus and LD data are additional examples of the type of information collected regardless if standard or non-standard clauses are in the contract.

FIG. 4 is a exemplary screen display 160 showing data fields for collecting information regarding the limit of liability for default of a contract. For contracts having a limitation of liability (LOL) clause for default, the T&C application 126 prompts the user to enter data regarding monetary amount of the limits. For example, the data boxes 162 collect information regarding the monetary limits of liability for the aggregate of the contract, on an annual basis, and per default event.

Further, the screen display 160 includes several data boxes 164 regarding whether the contract has exceptions to the standard the default terms of the contract for various events. To the extent that the contract clauses are standard, the boxes 164 are designated as NO, and the T&C application does not collect further information about those clauses. But, if non-standard contract clauses are used, they are treated as exceptions. These exceptions from the standard terms may increase the risk for default posed by the contract to the company. Where a YES is centered in the data boxes 164 to indicate that a non-standard clause is used, then the T&C application collects additional information regarding the exceptions to standard clauses. The additional information is collected using screen displays subsequently displayed. For example, a display 165 (See FIG. 5) may prompt the user to enter information regarding a currency specified in a non-standard clause. Based on the information collected via the screen display shown in FIG. 6, the T&C application can capture and store in the T&C data fields 120 data relevant to accessing the risks presented to the company if it defaults on the contract.

Figure 5:
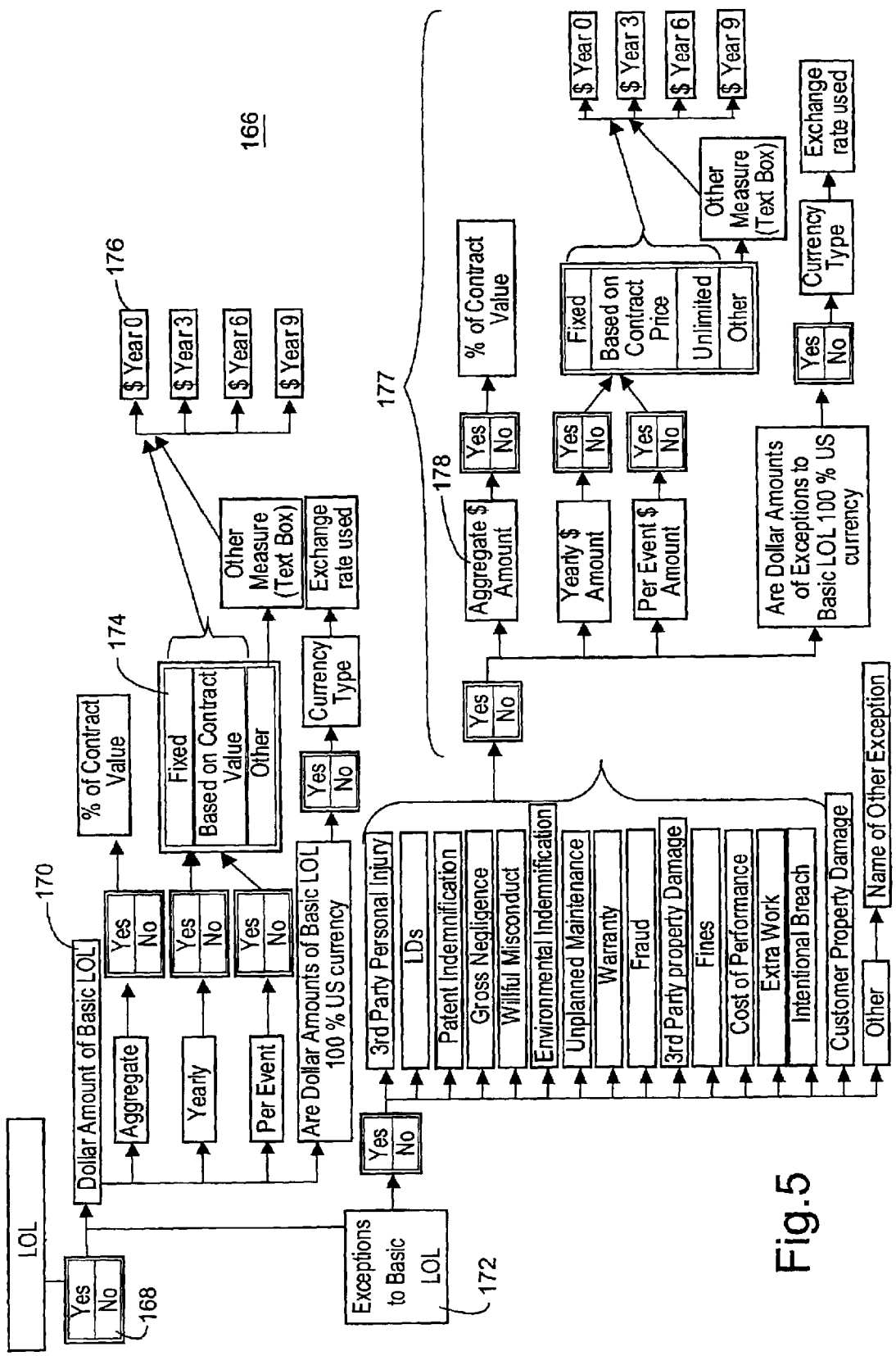
FIG. 5 is a flow chart showing the steps for dynamically varying the type and amount of data collected regarding the terms and conditions of a contract.

FIG. 5 is a flow chart showing the collection of data on terms and conditions of a contract, and the additional data collected for non-standard (exemption) clauses. FIG. 5 shows the sequence steps 166 for collecting terms and condition data for the limitation on liability of a contract. If a YES is entered in the limitation on liability (LOL) data field 168, then the screen shown in FIG. 6 is displayed. If a NO is entered in the LOL field 168, then no further screens are displayed regarding the LOL terms and conditions. In response to a YES entry in the LOL data field 168, the T&C application collects data 170 on the monetary limits of the data. For example, if there is an aggregate limit on the LOL, then the T&C application displays screens with data fields to collect data regarding the aggregate limit as a percentage of the total value of the contract. Similarly, different limits on LOL for various years of the contract are entered into the database. Thus, terms and conditions that pose risk to a company are quantified, such as in monetary terms. The monetary risk values assigned to a term and condition of a contract are treated as a cost of the contract when determining the risks and rewards of the contract.

With respect to exceptions to the LOL standard contract clause, the T&C application prompts the user to identify any exceptions in a contract to the basic contract claims for the limitation of liability. Each exception is a deviation from the standard contract terms and conditions. The deviation is evaluated for its effect on the risk of the contract. Whereas the risk posed by standard terms and conditions is known or can be determined with minimal data from a contract, the risk posed by terms and conditions that deviate from standard terms and conditions is not fully known. Additional information is needed about a non-standard clause to evaluate its risk.

The T&C application displays a sequence of displays screens corresponding to steps 177 designed to collect data regarding terms and conditions that differ from standard terms and conditions. If the gross negligence clause is non-standard, the a series of steps 177 are taken to generate screen requests for data prompt the user to enter such information as whether the clause includes limits 178 for aggregate, yearly and per event gross negligence claims. The steps may further include collecting data on how these limits are determined, their value as a percent of the contract, and if the limits vary over the years.

If the terms and conditions are standard contract clauses, then the T&C application may collect minimal or a standard set of information on the terms and conditions. The standard set of information may be collected for the term and condition, for both standard and non-standard contract clauses. If the terms and conditions in a contract differ from standard contact terms, the T&C application collects additional information and generates the screen displays designed to collect the additional data to fully document the variances in the term and condition. Accordingly, the T&C application dynamically varies the amount of information collected about a contract based on whether selected terms and conditions of a contract vary from standard contract term and conditions.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A method for collecting and storing data in a database of a computer system regarding a contractual agreement comprising:

establishing a plurality of data fields in said database each corresponding to one of a plurality of contract terms or contract conditions;

identifying a clause in the contractual agreement corresponding to a selected one of the contract terms or contract conditions;

correlating the identified clause to a data field corresponding to the selected clause or condition;

extracting from the database a standard contract clause linked to the corresponding data field for the selected clause or condition;

comparing the identified clause to the standard contract clause linked to the corresponding data field for the selected contract term or contract condition;

if the identified clause is substantively the same as the standard contract clause, then storing data indicating that the contractual agreement includes the standard contract clause for the selected contract term or contract condition, and if the identified clause differs substantively from the standard contract clause, collecting additional data regarding the identified non-standard clause, storing the additional data and linking the stored additional data to the said corresponding data fields, wherein the non-standard contract clause has not previously been stored in the database.

2. A method as in claim 1 further comprising a sequence of prompts issued by the computer system to collect the additional data regarding the identified nonstandard clause.

3. A method as in claim 2 wherein said sequence of prompts are displayed on a computer and the additional data is entered via said computer.

4. A method as in claim 1 wherein the selected contract term or contract condition is selected from a group consisting of: Application of New Technology, Assignment, Limit of Liability, Termination, Title Transfer, Spare Parts Delivery, End of Term Obligation, Governing Law, Dispute Resolution, Payment, Contracted Performance, Inventory Utilization, Insurance, Contracting Party, contracting Payment Security, Taxes, Warranty, Escalation and Notification.

5. A method as in claim 1, wherein the contractual agreement is proposed and not yet executed.

6. A method for collecting data in a database of a computer system regarding contractual agreements comprising:

- establishing standard contract clauses for selected contractual terms and conditions;
- comparing clauses in a contractual agreement to the standard contract clauses;
- identifying the clauses in the contractual agreement that are substantively the same as at least one of the standard contract clauses, and entering data in the database identifying those clauses of a contract that are substantively the same as the at least one of the standard contract clauses;
- for a clause in the contractual agreement that is not substantively the same as at least one of the standard contract clauses previously stored in the database, issuing a prompt from the computer system to collect information regarding the non-standard clause which is not requested for corresponding standard clauses, and
- storing the collected information regarding the identified non-standard clause in the database.

7. A method as in claim 6 further comprising a sequence of prompts issued by the computer system to collect the additional data regarding the identified nonstandard clause.

8. A method as in claim 7 wherein said sequence of prompts are displayed on a computer and the additional data is entered via said computer.

9. A method as in claim 6 wherein the selected contract term or contract condition is selected from a group consisting of: Application of New Technology, Assignment, Limit of Liability, Termination, Title Transfer, Spare Parts Delivery, End of Term Obligation, Governing Law, Dispute Resolution, Payment, Contracted Performance, Inventory Utilization, Insurance, Contracting Party, contracting Payment Security, Taxes, Warranty, Escalation and Notification.

10. A method for collecting data in a database of a computer system regarding contractual agreements comprising:

- identifying a clause in a contractual agreement corresponding to a selected contract term or contract condition;
- comparing the identified clause to a standard contract clause corresponding to the selected contract term or contract condition;
- if the identified clause is substantively the same as the standard contract clause, then storing in one of said data fields data indicating that the contractual agreement includes the standard contract clause for the selected contract term or contract condition and assigning a standard risk factor to the identified clause;
- if the identified clause differs substantively from the standard contract clause, collecting additional data regarding the identified non-standard contract clause, storing the additional data in an appropriate fields of said plurality of data fields, and
- assessing a risk associated clause based on the additional data collected for each identified non-standard contract clause in the contractual agreement.

* * * * *